May 24, 1927.
E. G. SPRUNG
BRAKE
Filed May 6, 1926
1,629,746
3 Sheets-Sheet 1
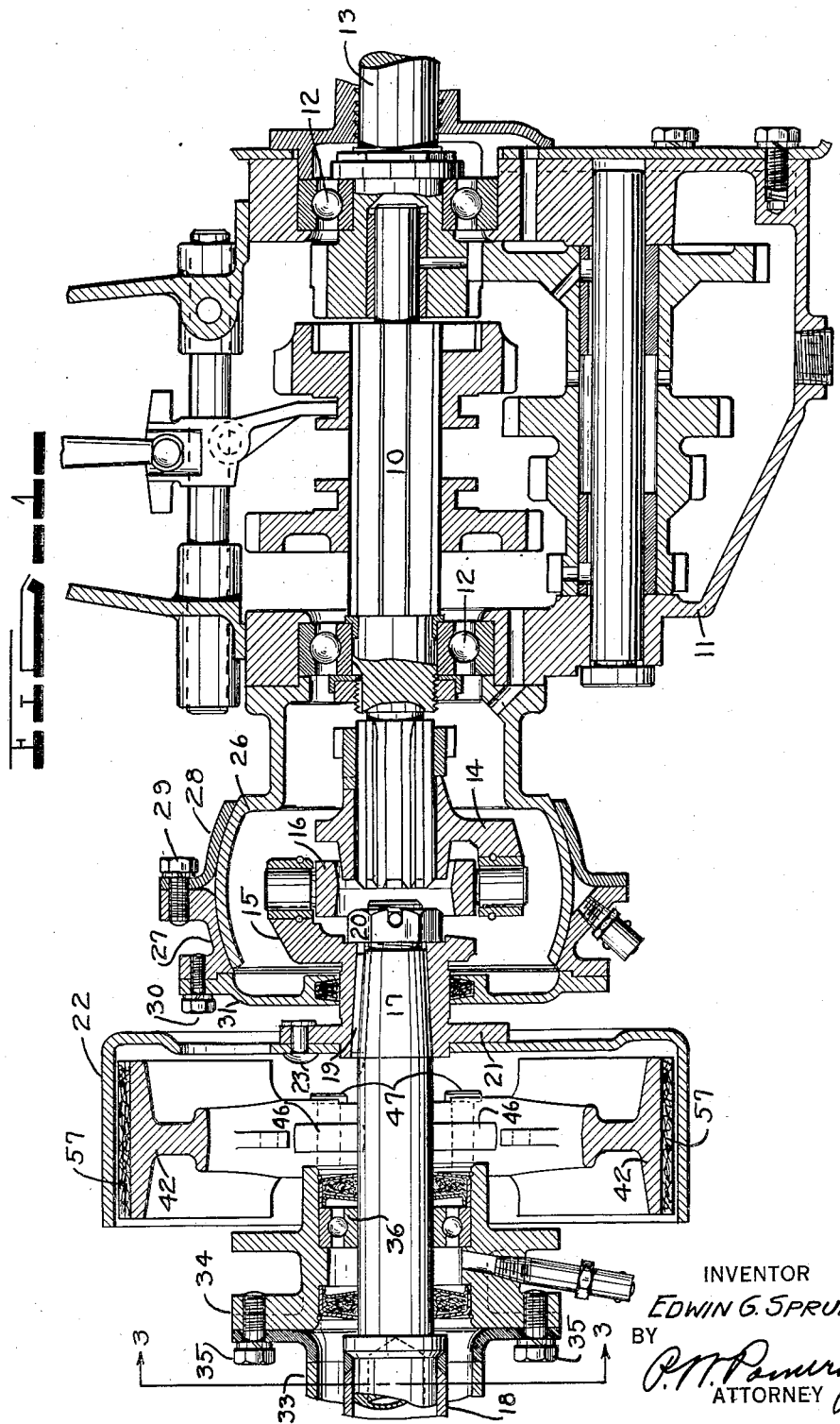
INVENTOR
EDWIN G. SPRUNG.
BY
ATTORNEY

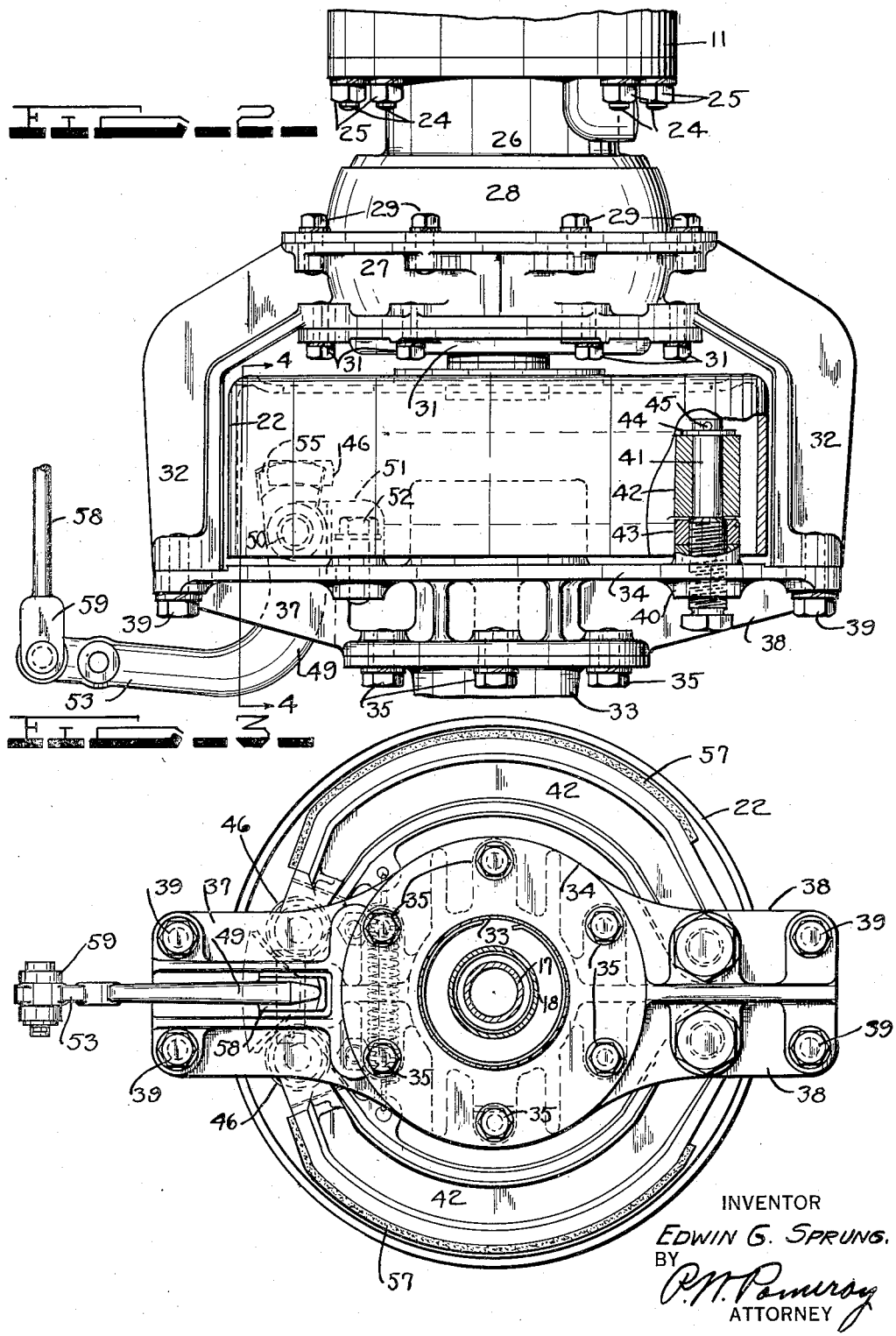

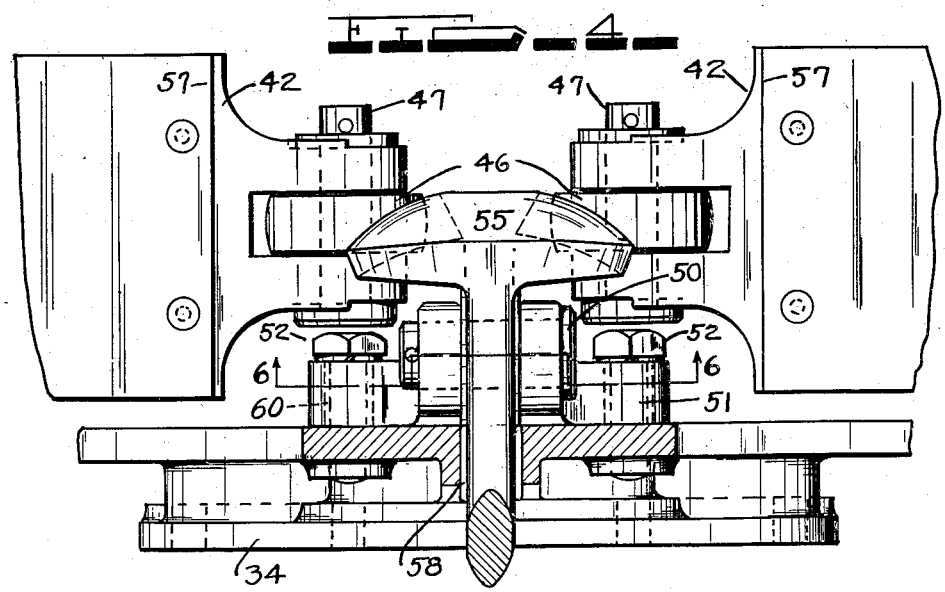
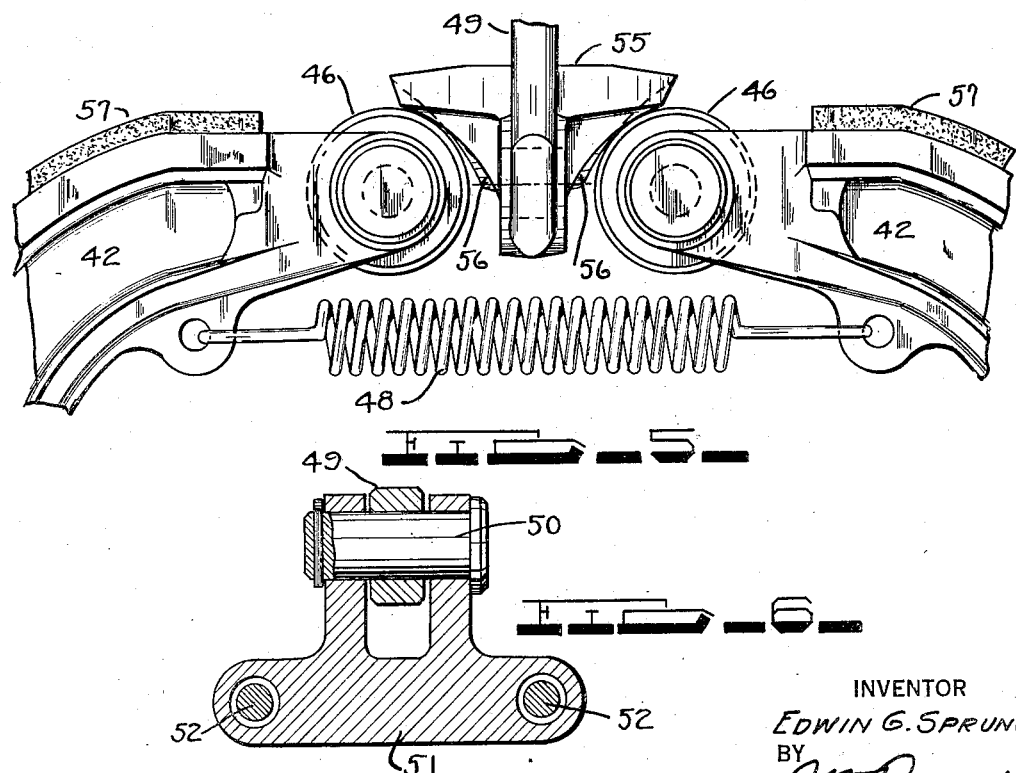

Patented May 24, 1927.

1,629,746

UNITED STATES PATENT OFFICE.

EDWIN G. SPRUNG, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed May 6, 1926. Serial No. 107,124.

This invention relates to motor vehicles and particularly to the braking mechanism thereof.

The main object of this invention is to provide a brake for the driving mechanism of a motor vehicle, which will be efficient, simple in construction, easily applied, and be easily adjustable to compensate for wear of the brake shoes.

Another object is to provide a motor vehicle with a driving mechanism brake, which includes a drum secured to the forward end of the propeller shaft thereof.

Another object is to provide a brake on the propeller shaft of a motor vehicle of the type in which the driving force from the rear wheels is transmitted to the vehicle through a torque tube, the drum for the brake being secured to the forward end of the propeller shaft immediately behind the universal joint, and the brake shoes being supported by a bracket secured to the forward end of the torque tube which terminates immediately behind the brake drum, the forward end of the torque tube being supported by arms on the universal joint housing which span the drum.

Another object is to provide a brake of the internal shoe type with an operating mechanism of such a type that the two brake shoes will be forced into contact with the brake drum at identically the same instant and with identically equal forces.

A further object is to provide a brake of the internal shoe type with an operating mechanism comprised principally of a lever-operated, wedge-shaped cam adapted to force the free ends of the shoes outwardly to contact with a brake drum.

A still further object is to provide a brake mechanism of the internal expanding shoe type with an operating member comprising a lever pivoted between its ends and having divergent cam faces at one end thereof, which faces contact with roller members secured to the free ends of the brake shoes, and which, when actuated, force the shoes outwardly into contacting relation with the brake drum, thereby to produce the desired braking effect.

These being among the objects of the present invention the same consists of certain features of construction and combinations of parts to be hereinafter described with reference to the accompanying drawings and then claimed, having the above and other objects in view.

In the accompanying drawings which illustrate a suitable embodiment of the present invention and in which like numerals refer to like parts throughout the several views:

Figure 1 is a longitudinal sectional view taken through the transmission, universal joint and propeller shaft of motor vehicle, showing a brake on the propeller shaft in accordance with the present invention.

Figure 2 is a plan view of a portion of Figure 1 showing the transmission brake and brake supporting arms.

Figure 3 is a transverse section taken substantially on the line 3—3 of Figure 1, showing an end view of the brake supports and the brake operating means.

Figure 4 is an enlarged partial plan view of the brake shoes and operating members taken on the line 4—4 of Figure 2, with the brake drum removed to better show the construction.

Figure 5 is a side elevation of the parts shown in Figure 4 with the brake support removed to more clearly show the operating mechanism.

Figure 6 is a sectional elevation of the operating cam supporting bracket, taken on the line 6—6 of Figure 4 to show the adjusting and compensating means.

As shown in the accompanying drawings, the brake is adaptable to the propeller shaft of a motor vehicle embodying the use of a torque drive, that is, one in which the driving force from the rear axle and shocks from the rear wheels are taken up and absorbed by a housing or tube surrounding the propeller shaft, which is connected to the transmission casing by a universally movable spherical joint that encloses the universal joint.

The main transmission shaft 10, as illustrated in Figure 1, is supported in the transmission case 11 by suitable bearings 12 and is connected at its forward end by the usual countershaft gearing to a shaft 13 that is driven by the engine. Conventionally splined to the rear end of the shaft 10 is the forward universal joint yoke 14 which is connected in the customary manner to the rear universal joint yoke 15 by the cross 16. The rear yoke 15 has a tapered axial opening provided with a keyway, which opening receives the forward end 17 of the propeller shaft 18, a key 19 and nut 20, threaded on to the part 17, holding the same in secured position as shown. The rear yoke 14 is further provided with a flanged portion 21 to which a concentric brake drum 22 is attached by conventional rivets 23.

Bolted directly to the transmission case 11 by studs 24 and nuts 25 is a spherical-shaped inner universal joint housing 26, enclosing which, is a spherical-shaped outer housing 27 provided with a complementary spherical retainer 28 which is secured thereto by cap screws 29. Likewise secured to the outer housing 27 by screws 30 is a grease retainer plate 31.

Referring to Figure 2, a pair of arms or brake supporting brackets 32 are formed on and project from the outer universal joint housing 27 and extend rearwardly therefrom along the sides of the brake drum 22 to span the same.

As previously mentioned this construction embodies the use of a torque tube 33 which terminates immediately at the rear of the drum 22 and to the forward end of which a brake support 34 is secured by suitable screws 35. The support 34 receives the bearing 36 for the forward end of the propeller shaft 18 and is provided with outwardly and oppositely extending arms 37 and 38 which are secured to the supporting arms or brackets 32 of the housing 27 by bolts or screws 39 thereby to support the forward end of the torque tube and to transmit the driving force therefrom to the inner universal joint housing 26.

Bosses 40 are provided on the brake support 34 for threadably receiving the pins 41 upon which two semi-circular brake shoes 42 are pivotally supported within the drum 22, as shown in the partial section of Figure 2, the nuts 43 being placed between the shoes 42 and bosses 40 to form a lock in order to prevent inwardly or outwardly movement of the shoes 42 on the pins 41. The shoes 42 are retained on the pins 41 by washers and keys such as 44 and 45 respectively. To prevent excessive and unneeded movement of the shoes 42 along the axes of the pins 41 and consequent rattling of the same, the pins 41, when the shoes 42 are assembled thereon, are threaded gradually outwardly until the shoes 42 are drawn by the washers 44 firmly against the nuts 43, which have been previously loosened a small amount, at which point the nuts 43 are tightened against the bosses 40, thereby creating sufficient longitudinal play of the shoes 42 on the pins 41 to allow rotation and prevent binding of the same.

Referring now to Figure 4 and Figure 5, the opposite or free ends of the shoes 42 are slotted in a plane radial to the axis of the drum 22 to form substantially U-shaped extremities which receive rollers 46 mounted on pins 47 that extend through openings in the sides thereof parallel to the axis of the drum 22. A coiled spring such as 48 is provided between the free ends of the shoes 42 which exerts a constant tendency to draw them together and hold the rollers 46 against the cam hereafter described.

The arm 37 is centrally slotted at 58 in a plane radial to the brake drum to receive and to permit free movement of a lever 49 supported and pivoted between its ends on a pin 50 which is carried by a bracket 51 secured to the brake support 34 by screw bolts 52. One end 53 of the lever extends rearwardly and then radially outwardly and the other end 54 extends inwardly substantially parallel on the axis of the drum 22, terminating in a wedge-shaped cam 55 which lies between and contacts with the rollers 46 positioned on the free ends of the brake shoes 42, the narrow part or apex thereof being situated radially inwardly from the broad part which normally lies between the drum 22 and the rollers 46.

Although the faces 56 of the cam 55 are shown in Figure 5 as being concave, it is to be understood that other forms may be substituted to give equally as desirable results. In both instances it is important in order to get the correct action of the brake operating mechanism, that the faces 56 be cut on an angle such that when the lever 49 is moved on its pivot pin 50 from its maximum to minimum position, a plane, passed through the point of contact of the face 56 with the roller 46 parallel to the axis of the roller 46, will likewise be parallel to the cam face 56 at this point of contact, this being true for any contacting position of the cam faces 56 with the roller 46. This provides a condition whereby as the brake is being operated, the cam 55 will apply its spreading force exactly on the center lines of the shoes 42, the line of contact of the roller 46 with the cam faces 56 being along the center lines of said faces, thereby creating an even contacting relation between the brake drum 22 and the brake shoe friction facing 57, also causing the shoes 42 to operate evenly as the tendency of either shoe to bind on its pivot pin 41 is avoided, due to the non-angular braking force.

The lever 49 is operated from a foot-pedal or hand lever (not shown) and is connected thereto by the rod 58 and yoke end 59 attached to the end 53 thereof.

In operation, the brake pedal, or other operating means, is depressed to pull the end 53 of the lever 49 forwardly thereby rotating the lever 49 on the pivot pin 50 and causing the cam 55 to move inwardly between the rollers 46 to force the shoes 42 outwardly to contact with the brake drum 22. As the brake pedal is released the cam 55 is caused to retract by the coiled spring 48 which pulls the shoes back to normal non-contacting or non-braking position.

It was previously mentioned that it was one of the objects of this invention to provide a brake operating mechanism in which the shoes would contact with an equal force and at the same time. From the foregoing description it can readily be seen that in using a wedge-shaped pivoted cam co-operating with rollers secured to the free ends of the brake shoes, or even without the rollers, the desired end is met in that even braking pressure and even wearing of the shoe facings are obtained. There is no doubt that in the conventional type of internal expanding shoe type brakes heretofore used which were operated by a rotated cam having oppositely extending cam faces, one cam portion will tend to act radially inward against its respective face on the shoe and the other cam portion will tend to act radially outward in respect to the drum, tending to cause the shoe against which the braking force is applied radially outward to contact with the brake drum before the other shoe, thereby creating an uneven braking pressure and uneven wearing of the shoe facing.

In case the shoes become worn to such an extent that their efficiency is decreased, the wear may be compensated for by loosening the screws 52 which bolt the bracket 51 to the brake support 34, and forcing the bracket 51, and therefore the cam 55, inwardly the desired amount, the openings 60 through which the screws 52 pass being enlarged to provide such an adjustment.

In order to insure the cam forcing the shoes 42 against the drum 22 with equal pressure on each shoe, the arm 39 is allowed a certain amount of axial play on the pin 50 upon which it is pivoted as shown in Figure 6. The effect of this axial play is such that should the cam force one shoe 42 into contact with the drum 22 before the other shoe 42 contacted with the drum, the pressure between the cam and the contacting shoe will force the lever 49 along the axis of the pin 50 towards the other shoe, carrying the cam with it, until the pressure between each shoe and the cam is equalized, thus insuring equal pressure between both shoes and the drum, and consequently the greatest braking effect for a given pressure.

Another advantage of the present invention over the type wherein the brake drum is secured to the transmission shaft, is that by placing the drum on the propeller shaft rearwardly of the forward universal joint, chattering is avoided due to the elimination of the slack or play in the forward universal joint.

Formal changes may be made in the specific embodiment of the invention described, without departing from the spirit and substance of the broad invention, the scope of which is commensurate with the appended claims.

What I claim is:—

1. In a motor vehicle, the combination with a propeller shaft, an end of which is connected by a universal joint to a transmission shaft, and a housing for said universal joint, of a brake drum secured to said propeller shaft adjacent said universal joint, and a brake mechanism supported by said universal joint housing, co-operating with said drum.

2. In a motor vehicle, the combination with a propeller shaft, the forward end of which is secured to a driving member by a universal joint, a torque tube, enclosing said propeller shaft, and a housing for said universal joint, of a brake drum, secured to said propeller shaft adjacent said universal joint, a bracket secured to the forward end of said torque tube and supported by said universal joint housing, and a co-operating brake mechanism secured to said bracket.

3. In a motor vehicle provided with a transmission case and a driving shaft, the combination with a propeller shaft connected at its forward end by a universal joint to said driving shaft, a torque tube and a universal joint housing supported by said transmission case, of a brake drum secured to said propeller shaft adjacent said universal joint, a bracket secured to said torque tube and supported by arms formed on said universal joint housing spanning said brake drum, and a brake mechanism secured to said bracket, adapted to engage with said brake drum.

4. In a motor vehicle, the combination with a rotatable propeller shaft having a brake mounted thereon and a stationary bracket member, of a pair of shoes having adjacent ends pivotally secured to said bracket member, each of the opposite adjacent ends thereof being provided with a roller member, a coil spring tending to normally draw said shoes inwardly toward each other, and a lever provided with a wedge-shaped end engaging said shoes and pivoted between its ends on said bracket.

5. In a brake mechanism, the combination with a rotatable drum and a pair of brake shoes co-operating with said drum, of an axially movable operating lever pivoted between its ends and having a wedge-shaped end co-operating with the free ends of said brake shoes, said lever being adjustable relative to said shoes.

6. In a brake mechanism, the combination with a rotatable brake drum and a pair of brake shoes, of a bell crank lever having a wedge-shaped end co-operating with the adjacent free ends of said shoes for spreading the same, and an adjustable support for initially positioning said bell crank in respect to said shoes.

7. In a brake mechanism, the combination with a rotatable drum and a pair of co-operating brake shoes pivoted on a support, a bell crank having a wedge-shaped end co-operating with the adjacent free ends of said shoes for spreading the same, and a bracket for adjustably supporting said bell crank on said support and secured thereto by screw means, said adjustment being provided by enlarged openings in one of said parts through which said screw means project.

8. In a brake mechanism, the combination with a rotatable brake drum and a pair of shoes co-operative with said drum having rollers on the free ends thereof, of a pivoted floating bell crank having a divergent faced cam end engaging said rollers thereby to cause equal distribution of pressure to said brake shoes.

9. In a brake mechanism, the combination with a rotatable brake drum and a pair of shoes co-operative with said drum having rollers on the free ends thereof, of a floating operating lever pivotally supported between its ends and engaging said rollers whereby to exert equal pressure on said rollers.

10. In a brake mechanism, the combination with a rotatable brake drum and a pair of shoes co-operative with said drum having rollers on the free ends thereof, of a floating operating lever pivotally supported between its ends and engaging said rollers whereby to exert equal pressure on said rollers.

11. In a brake mechanism, the combination with a rotatable brake drum and a pair of shoes co-operative with said drum, of a lever pivoted between its ends on a shaft and provided with a wedge-shaped end co-operating with the free ends of said brake shoes whereby to spread the same upon actuation thereof, said lever being axially slidable upon said shaft whereby to equalize the pressure applied to each of said shoes upon said actuation.

Signed by me at Detroit, Michigan, U. S. A., this 1st day of May, 1926.

EDWIN G. SPRUNG.